(12) United States Patent
Wallentin et al.

(10) Patent No.: US 7,756,532 B2
(45) Date of Patent: Jul. 13, 2010

(54) REESTABLISHING WIRELESS COMMUNICATION BETWEEN A RADIO ACCESS NETWORK AND A MOBILE STATION

(76) Inventors: Pontus Wallentin, Hjalmsatersgatan 2B, Linkoping (SE) SE-582 17; Per Olof Magnus Magnusson, Skogsgatan 51, Linkoping (SE) SE-587 23

( * ) Notice: Subject to any disclaimer, the term of this patent is extended or adjusted under 35 U.S.C. 154(b) by 704 days.

(21) Appl. No.: 11/568,667

(22) PCT Filed: May 13, 2004

(86) PCT No.: PCT/IB2004/050672

§ 371 (c)(1),
(2), (4) Date: Nov. 3, 2006

(87) PCT Pub. No.: WO2005/112500

PCT Pub. Date: Nov. 24, 2005

(65) Prior Publication Data

US 2008/0039106 A1    Feb. 14, 2008

(51) Int. Cl.
*H04W 72/00*  (2009.01)
(52) U.S. Cl. .................. 455/464; 370/216; 370/228
(58) Field of Classification Search .......... 370/216–228
See application file for complete search history.

(56) References Cited

U.S. PATENT DOCUMENTS

| 5,966,384 | A  | * | 10/1999 | Felix et al. ............... 370/465 |
| 6,507,567 | B1 |   | 1/2003  | Willars |
| 6,603,773 | B2 | * | 8/2003  | Laakso et al. ............ 370/441 |
| 2001/0018342 | A1 | * | 8/2001 | Vialen et al. ............ 455/423 |
| 2001/0018354 | A1 |   | 8/2001 | Vialen |

FOREIGN PATENT DOCUMENTS

EP    1408658 A2    4/2004
GB    2382273 A     5/2003

* cited by examiner

*Primary Examiner*—Rafael Pérez-Gutiérrez
*Assistant Examiner*—Marcos Batista
(74) *Attorney, Agent, or Firm*—Roger S. Burleigh

(57) ABSTRACT

The present invention relates to a method for reestablishing wireless communication between a radio access network (RAN1) and a mobile station (MS1), an apparatus (RNC1) used for implementing the method as well as a radio access network (RAN1) including such an apparatus. A downlink radio failure affecting a first set of radio bearers (RB1, RB2) including at least two radio bearers (RB1, RB2) assigned for communicating user data between the radio access network (RAN1) and the mobile station (MS1) is detected. A second set of radio bearers (RB1) for communicating user data is defined, excluding the radio bearer (RB2) having the highest downlink bit rate in the first set of radio bearers (RB1, RB2). Communication reestablishment is initiated using the second set of radio bearers (RB1).

14 Claims, 3 Drawing Sheets

US 7,756,532 B2

REESTABLISHING WIRELESS COMMUNICATION BETWEEN A RADIO ACCESS NETWORK AND A MOBILE STATION

TECHNICAL FIELD OF THE INVENTION

The invention relates to a method for reestablishing wireless communication, an apparatus used for implementing the method as well as a radio access network including such an apparatus.

DESCRIPTION OF RELATED ART

In radio communication systems, such as the Universal Mobile Telecommunication Systems (UMTS) specified by the $3^{rd}$ Generation Partnership Project (3GPP), the radio coverage is typically dependent of the bit rate used by a given communication service, since higher bit rates require higher output power.

In UMTS, so called Radio Access Bearers (RABs) are used for carrying user data between mobile stations and the core network. The part of a RAB used to convey user data between a mobile station and the UMTS Terrestrial Radio Access Network (UTRAN) is called a radio bearer.

One scenario (multi-RAB) that may occur in a UMTS system is that a mobile station has a low bit rate radio bearer, such as circuit-switched speech, established together with a high bit rate radio bearer, such as packet switched 64 kbps data. In this scenario, situations may arise where the mobile station loses coverage for the high bit rate radio bearer but still has enough coverage for the low bit rate radio bearer. The lack of coverage for the high bit rate radio bearer will result in a radio link failure.

The simplest way for UTRAN to respond to a radio link failure would be to instruct the mobile station to locally release all radio bearers at radio link failure without UTRAN intervention, which will lead to a dropped call, which means that also the speech service is dropped.

An alternative response to a radio link failure, as teached by the 3GPP specifications, is for UTRAN to re-establish all physical channels and all radio bearers after the mobile station has reported the radio link failure to UTRAN. Reestablishing all radio bearers in response to a radio link failure may, depending on the cause of the radio link failure, sometimes be successful. However, in the situation elaborated above, this will lead to another radio link failure since the mobile station is out of coverage for the high bit rate radio bearer.

Further, another alternative way of responding to a radio link failure provided for in the 3GPP specifications (see also published international application WO 01/63955), is that a mobile station is configured, upon establishment of radio bearers, to release radio bearers sensitive to long delays which may occur before the mobile station is back into radio coverage after the radio link failure. In the multi-RAB scenario described above, this alternative would cause the mobile station to release the speech radio bearer but keep the 64 kbit packet switched data radio bearer which would not remedy the situation elaborated above.

Yet another alternative mechanism of handling a radio link failure is to let the core network perform a call re-establishment. However, this is both a rather slow mechanism and the core network cannot take into consideration radio related aspects such as power aspects when deciding which bearer(s) to re-establish.

SUMMARY OF THE INVENTION

The problem addressed by the present invention is providing a way of reducing the probability for dropped communication sessions.

The problem is solved by a method according to claim 1 and an apparatus according to claim 7.

One advantage afforded by the invention is a reduced risk for dropped communication sessions (i.e. calls) in situations where multiple communication services are used in parallel over a radio interface, e.g. speech in combination with best effort data (WWW-surfing, MMS, instant share etc.).

A more specific advantage of the invention is that it improves the probability for successful reestablishment of communication in situations where a downlink radio failure occurs affecting multiple communication services used in parallel over a radio interface.

The invention will now be described in more detail with reference to exemplary embodiments thereof and also with reference to the accompanying drawings.

DETAILED DESCRIPTION OF THE EMBODIMENTS

Figure 1:
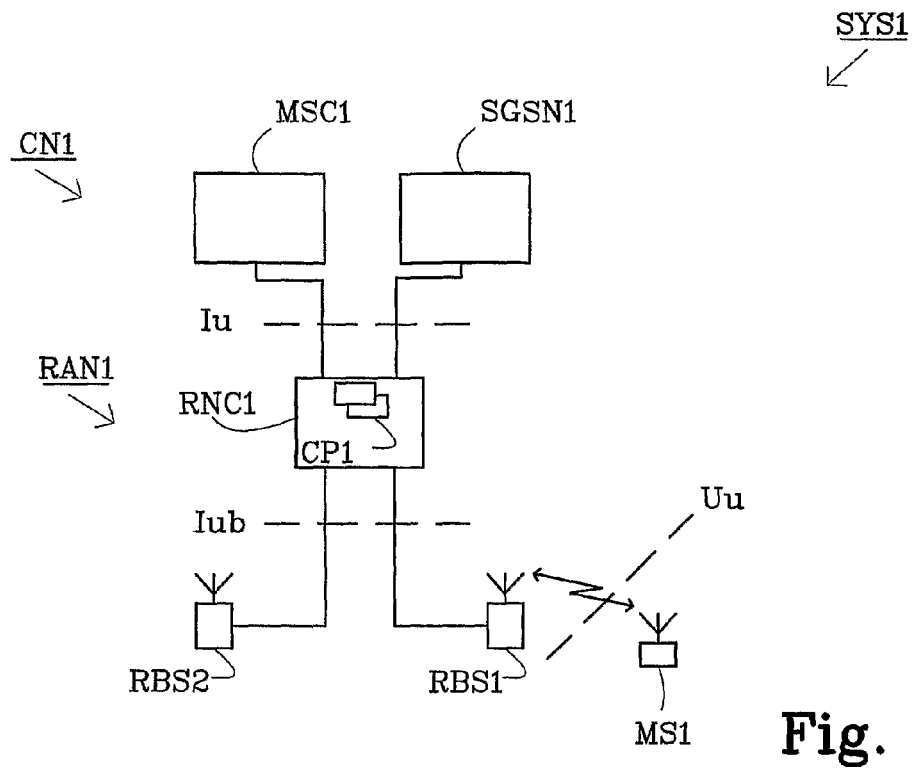
FIG. 1 is a schematic view of an example mobile communication system in which the present invention may be advantageously employed.

FIG. 1 illustrates a non-limiting example of a communication system SYS1 in which the present invention may be employed. The exemplary communication system SYS1 illustrated in FIG. 1 is a Universal Mobile Telecommunication System (UMTS). The communication system SYS1 includes a core network CN1, a UMTS Terrestrial Radio Access Network (UTRAN) RAN1 and User Equipment (UE), alternatively referred to as mobile stations (MS).

The core network CN1 includes a Mobile services Switching Center (MSC) node MSC1 that provides circuit-switched services and a General Packet Radio Service (GPRS) node SGSN1, sometimes referred to as a Serving GPRS Support node (SGSN), which is tailored to provide packet-switched type services.

Each of the core network nodes MSC1 and SGSN1 connects to the the radio access network RAN1 over a radio access network interface referred to as the Iu interface. The radio access network RAN1 includes one or more radio network controllers (RNCs). For sake of simplicity, the radio access network RAN1 of FIG. 1 is shown with only one radio network controller node RNC1. Each radio network controller is connected to and controls a plurality of radio base stations (RBSs). For example, and again for sake of simplicity, FIG. 1 only illustrates a first radio base station node RBS1 and a second radio base station node RBS2 connected to the radio network controller node RNC1.

The interface between the radio network controller RNC1 and the base stations RBS1 and RBS2 is referred to as the Iub interface.

Mobile stations, such as mobile station MS1 shown in FIG. 1, communicate with one or more radio base stations RBS1-RBS2 over a radio or air interface referred to as the Uu interface.

Each of the radio interface Uu, the Iu interface and the Iub interface are shown by dashed lines in FIG. 1

Figure 2:
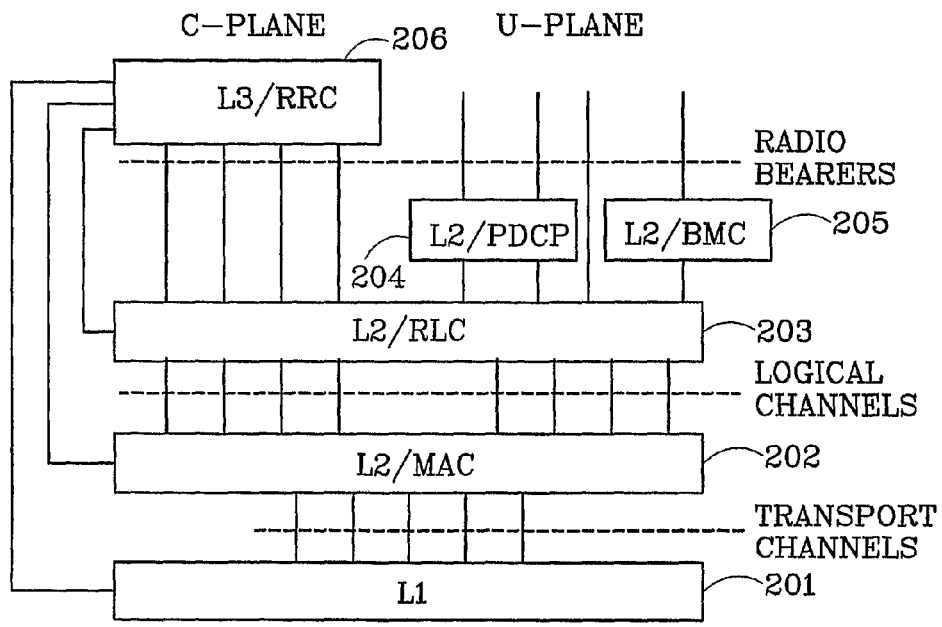
FIG. 2 is a block diagram providing a simplified illustration of the radio interface architecture of the communication system in FIG. 1

FIG. 2 is a simplified illustration of the radio interface architecture of the UMTS system illustrated in FIG. 1.

The radio interface is layered into three protocol layers:
the physical layer, also referred to as Layer 1 (L1)
the data link layer, also referred to as Layer 2 (L2)
the network layer, also referred to as Layer 3 (L3).

Layer 2 is split into a number of sublayers including Medium Access Control (MAC) 202, Radio Link Control (RLC) 203, Packet Data Convergence Protocol (PDCP) 204 and Broadcast/Multicast Control (BMC) 205.

Layer 3 and the RLC-sublayer are further divided into a Control-plane (C-plane) and a User-plane (U-plane) while the PDCP- and BMC-sublayers exist in the U-Plane only. The U-plane protocols implements so called radio access bearer services, i.e. services for carrying user data (e.g. speech, data or multimedia) between mobile stations and the core network. The C-plane provides protocols for controlling the radio access bearers and the connection between mobile stations and the network from different aspects.

The physical layer 201 offers information transfer services to the MAC-layer and higher layers. The physical layer transport services are described by how and with what characteristics data are transferred over the radio interface. These services are denoted Transport Channels. The physical layer 201 is responsible for mapping the transport channels onto physical channels of the radio interface Uu. The physical layer 201 performs functions including FEC encoding/decoding and interleaving/deinterleaving of transport channels, multi-plexing/demultiplexing of transport channels, rate matching, modulation/demodulation and spreading/despreading of physical channels, closed-loop power control and RF-processing.

The MAC-sublayer 202 provides data transfer services on logical channels. A set of logical channel types is defined for different kinds of data transfer services offered by the MAC-sublayer. Each logical channel type is defined by what type of information is transferred. The MAC-sublayer 202 performs functions including mapping between logical channels and transport channels, selection of appropriate transport format for each transport channel depending on instantaneous source rate, transport channel type switching and ciphering.

The RLC-sublayer 203 provides different data transfer services to higher layers including transparent, unacknowledged and acknowledged data transfer. The RLC-sublayer 203 performs functions including segmentation and reassembly of higher layer protocol data units, concatenation, ciphering, error correction and flow control.

The PDCP-sublayer 204 provides transfer of user data and header compression/decompression.

The BMC-sublayer 205 provides a broadcast/multicast transmission service in the user plane for common user data in unacknowledged mode.

The services provided by layer 2 for communication of data over the radio interface is referred to as radio bearers. The C-plane radio bearers, which are provided by RLC to RRC are denoted signaling radio bearers. The U-plane radio bearers provide the radio portion of radio access bearer services by carrying user data between mobile stations and the radio access network.

The Radio Resource Control (RRC) sublayer 206 of layer 3 handles the control plane signaling of Layer 3 between mobile stations and the radio access network RAN1. The functions handled by the RRC-sublayer 204 includes establishment/release of RRC connections between mobile stations and the radio access network as well as assignment, reconfiguration and release of radio resources for RRC-connections.

More details of the radio interface protocol architecture can be found in the $3^{rd}$ Generation Partnership Project (3GPP) specification TS 25.301 (version 3.11.0).

Radio Access Bearer Services are characterized by a number of attributes such as Traffic class, bit rate, Transfer Delay, Bit Error Rate (BER) etc specifying the Quality of Service (QoS) requirements the Radio Access Bearer (RAB) must fulfill. A Radio Bearer established to support a certain RAB must fulfill the QoS requirements of the RAB and thus inherits the same, or even stricter, QoS requirements as the RAB.

In radio communication systems, such as the system illustrated in FIGS. 1 and 2, the radio coverage is limited by the available transmission power and typically depends on the bit rate of a given communication service since higher bit rates require higher transmission power. This is schematically illustrated in FIG. 3, where the radio base station node RBS1 is illustrated as providing wider radio coverage (schematically illustrated by circle 303) for a low bit rate radio bearer RB1, such as circuit switched speech, and less radio coverage (schematically illustrated by circle 302) for a high bit rate radio bearer RB2, such as packet switched 64 kbps data.

The inventors of the present invention have recognized that in a multi-RAB scenario, i.e. where several RABs providing different bit rates are used in a communication session and consequently several radio bearers are established for communicating user data over the radio interface between UTRAN and a mobile station, situations may arise where the mobile station enters a location lacking radio coverage for a high bit rate radio bearer while still within radio coverage for a low bit rate radio bearer. FIG. 3 illustrates an example of such a multi-RAB scenario, where the mobile station MS1 has both a low bit rate radio bearer RB1 (speech) and a high bit rate radio bearer RB2 (packet switched 64 kbps data) established and the mobile station MS1 is located within the radio coverage 303 for the low bit rate radio bearer RB1 but outside the radio coverage 302 of the high bit rate radio bearer RB2.

Further, the user data flow on each radio bearer associated with a RAB would be mapped onto separate transport channels in the interface between the physical layer 201 and the MAC-sublayer 202 (see FIG. 2), but would typically in the physical layer 201 be multiplexed onto a so called Coded Composite Transport Channel (CCTrCH), which in turn is mapped onto one or more physical channels.

Figure 3:
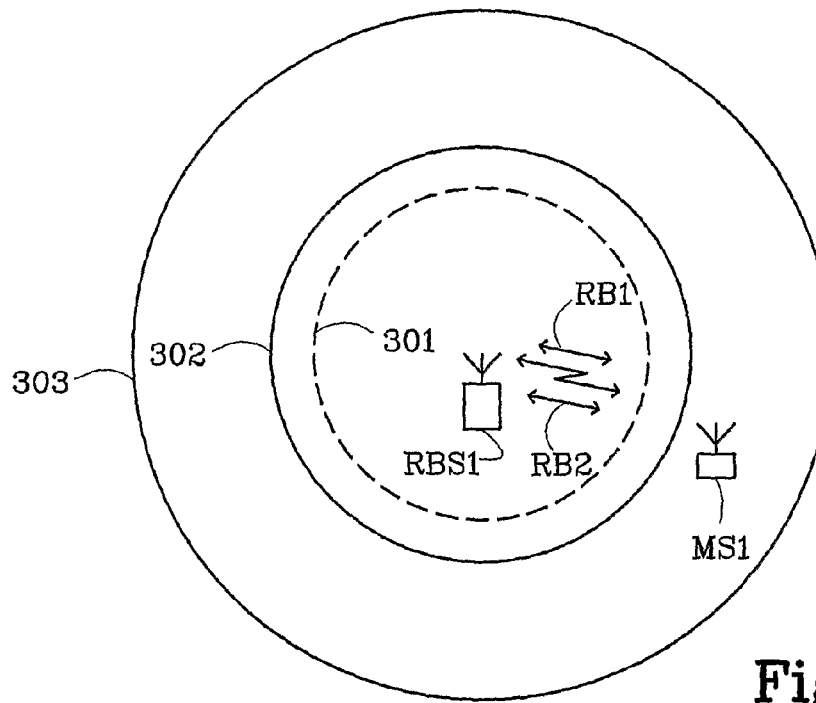
FIG. 3 is a schematic view illustrating different radio coverage for radio bearers providing different bit rates.

In the scenario illustrated in FIG. 3, when the maximum available output power of the mobile station MS1 is not sufficient in the uplink to match the current bit rate at any given moment, the mobile station MS1 will reduce the bit rate by blocking high bit rate Transport Format Combinations (TFCs) thereby reducing the required uplink power. This algorithm is able to reduce the power within fractions of a second (~50 ms/TFC limitation) and has therefore a reasonable chance to save the situation.

However, in the downlink, TFC limitations will not reduce the peak power required for communication with the mobile station MS1. Instead transport channel switching is needed to reduce the required downlink power. This mechanism requires over the air signaling between the radio access network RAN1 and the mobile station MS1, which is impossible when the downlink power is not sufficient. This means that insufficient downlink power will cause the mobile station MS1 to loose synchronization on the downlink dedicated physical channel and a radio link failure occurs.

In order to protect communications with other mobile stations, a maximum downlink power level for each mobile station is typically defined in the radio access network RAN1, and a condition of "insufficient downlink power" would typically imply that the required downlink power for maintaining communication with a certain mobile station exceeds this defined maximum level. Still, if the maximum downlink power settings per mobile station is to generous, situations may of course arise where it is the total downlink power available in a radio base station that is the limiting factor causing a condition of "insufficient downlink power".

The inventors have identified the following consequences of the multiplexing of several radio bearers onto the same Coded Composite Transport Channel in the scenario illustrated in FIG. 3.

First of all, since monitoring of radio link failures occurs on the physical level, a detected downlink radio link failure would affect all radio bearers multiplexed on the same Coded Composite Transport Channel, which implies that even though the mobile station MS1 is located well within the coverage area 303 for circuit switched speech, also the speech radio bearer RB1 would be affected by a radio link failure due to the mobile station MS1 being located outside the coverage area 302 for the 64 kbit packet switched data radio bearer RB2.

Another consequence of the multiplexing onto the same Coded Composite Transport Channel of both the speech radio bearer RB1 and the packet switched data radio bearer RB2, is that the resulting aggregated downlink bit rate would be higher than the downlink bit rate if the packet switched data radio bearer RB2 was used in isolation. The higher aggregated downlink bit rate would thus decrease the actual coverage area (schematically illustrated by dashed circle 301 in FIG. 3) when multiplexing both the speech radio bearer RB1 and the packet switched radio bearer RB2 onto the same Coded Composite Transport Channel as compared to the situation where the packet switched radio bearer RB2 is used in isolation.

The present invention addresses the situation elaborated above.

Figure 4:
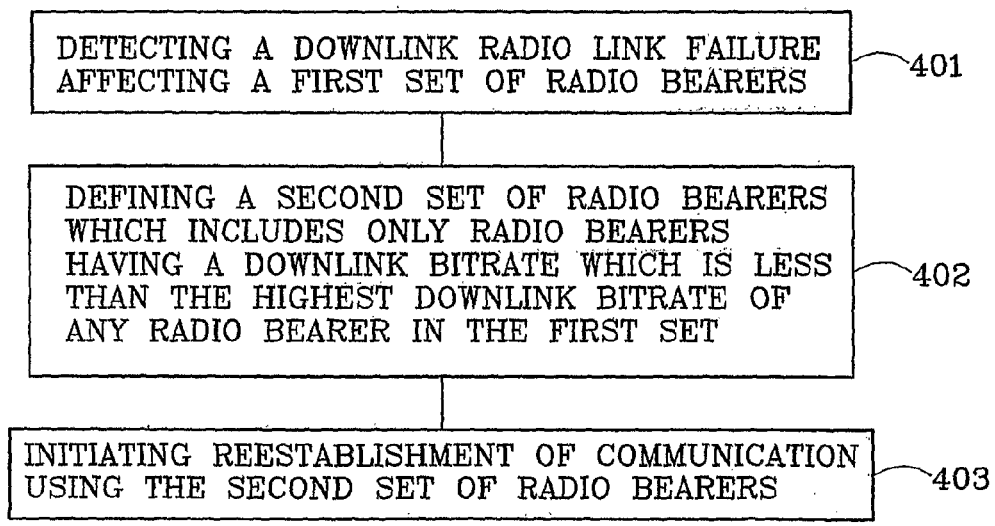
FIG. 4 is a flow diagram illustrating a basic method for reestablishing wireless communication according to the invention.

FIG. 4 illustrates a basic method according to the invention in a radio access network for reestablishing wireless communication with a first mobile station.

At step 401, a downlink radio link failure is detected which affects a first set of radio bearers including at least two radio bearers assigned for communicating user data between the radio access network and the first mobile station.

At step 402, a second set of radio bearers for communicating user data is defined in response to detecting the downlink radio link failure at step 401. The second set of radio bearers is defined to include only radio bearers having a downlink bit rate which is less than the highest downlink bit rate of any radio bearer in the first set of radio bearers. Thus the radio bearer in the first set having the highest downlink bit rate, is excluded from the second set.

Finally, at step 403 reestablishment of communication with the first mobile station using the second set of radio bearers is initiated.

Figure 5:
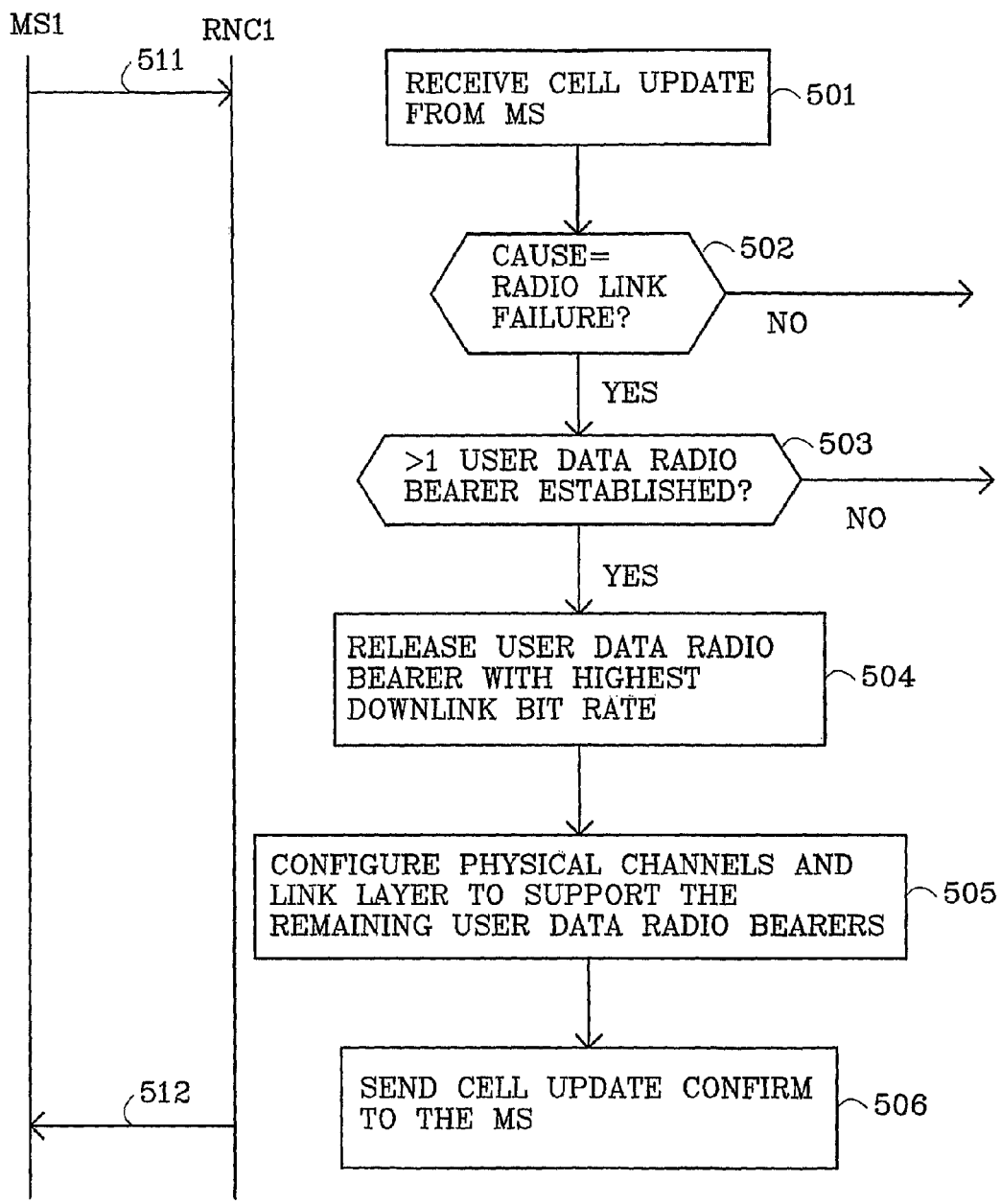
FIG. 5 is a combined flow and signal diagram illustrating a method for reestablishing wireless communication in accordance with a first exemplary embodiment of the invention.

A first exemplary embodiment of the invention for use in the context of the radio access network RAN1 in FIG. 1 is illustrated in FIG. 5. The method is illustrated by means of the previously used example scenario of FIG. 3.

At step 501 the radio network controller RNC1 receives a CELL UPDATE message 511 from the mobile station MS1.

At step 502, the radio network controller RNC1 determines whether the received CELL UPDATE message 511 includes a CAUSE information element indicating occurrence of a downlink radio link failure.

If the CAUSE information element indicates a downlink radio link failure (an alternative YES at step 502), processing continues at step 503, where it is determined whether the downlink radio link failure affects more than one U-plane radio bearer, i.e. whether the downlink radio failure affects a first set of radio bearers including at least two radio bearers assigned for communicating user data between the radio access network RAN1 and the mobile station MS1. In the scenario illustrated in FIG. 3, there is a first set of radio bearers including the low bit rate radio bearer RB1 (speech) and the high bit rate radio bearer RB2 (packet switched 64 kbps data) affected by the downlink radio link failure reported by the mobile station MS1.

If more than one U-plane radio bearer is affected by the downlink radio link failure (an alternative YES at step 503), the U-plane radio bearer with the highest downlink bit rate is released at step 504, i.e. a second set of radio bearers is defined characterized in that it only includes radio bearers having a downlink bit rate which is less than the highest downlink bit rate of any radio bearers in the first set of radio bearers. In the scenario illustrated in FIG. 3, a second set of radio bearers in the form of low bit rate radio bearer RB1 is defined by releasing the high bit rate radio bearer RB2.

At steps 505 and 506, the radio network controller RNC1 initiates reestablishment of communication with the mobile station MS1 using the remaining user data radio bearers, i.e. the second set of radio bearers.

At step 505, physical layer and the link layer are configured to support the remaining user data radio bearers.

Finally at step 506, a CELL UPDATE CONFIRM message 512 is sent from the radio network controller RNC1 to the mobile station MS1 informing the mobile station MS1 of the new channel configuration and instructing the mobile station to release the radio bearer excluded from the second set of radio bearers. The radio network controller RNC1 informs the core network CN1 of the RAB/radio bearer release by sending a RAB Release Request message to the core network CN1.

In the first exemplary embodiment of the invention, one or more control processors CP1 in the radio network controller RNC1 of FIG. 1 are programmed to perform the processing associated with the method illustrated in FIG. 5. Thus the radio network controller RNC1 can be regarded as an apparatus for performing the method of FIG. 5 and the control processors CP1 functions as means for performing the different method steps.

The inventive method of course does not remedy situations where a downlink radio link failure is caused by other reasons than a multi-RAB scenario, where the radio bearer having the highest bit rate causes the mobile station to be located outside proper radio coverage. Still, by applying the inventive method to radio link failures occurring in multi-RAB scenarios, the risk/probability for dropping communication sessions/calls can be reduced. This may in particular be of significant importance when introducing new communication services/combination of services.

Apart from the exemplary first embodiment of the invention disclosed above, there are several ways of providing rearrangements, modifications and substitutions of the first embodiment resulting in additional embodiments of the invention.

In the exemplary first embodiment disclosed above, whenever a downlink radio link failures affecting a first set of at least two U-plane radio bearers, i.e. radio bearers assigned for communicating user data between the radio access network RN1 and a mobile station, is detected, an attempt to reestablish communication is made by defining a second set of radio bearers, including only radio bearers having a downlink bit rate which is less than the highest bit rate of any radio bearer in the first set, and initiating reestablishment of communication using this second set of radio bearers. An alternative solution in other embodiments of the invention would be to decide, according to a predetermined rule, whether said defining and initiating steps should be performed in response to detecting a radio link failure. This way selective handling of radio link failures occurring in multi-RAB situations can be made, so that said defining and initiating steps are only performed when additional information (apart from the fact that a radio link failure has occurred in a multi-RAB situation) indicates that it is likely that the radio link failure occurred due to the radio bearer having the highest bit rate caused the mobile station to be located outside proper radio coverage. In the event the additional information indicates that it is less likely that the radio link failure was caused by too high downlink bit rate, and hence performing said defining and initiating steps would probably not remedy the situation, the radio link failure could be handled in an alternative and more appropriate way. One alternative could simply be to do nothing (i.e. relying on time supervision to clear resources in the network and the mobile station). Another alternative could be to attempt to reestablish communication using all radio bearers in the original set of radio bearers. One example of such additional information that could be taken into account would be the downlink power used for communicating with the mobile station when the downlink radio link failure occurred, i.e. the predetermined rule for deciding whether said defining and initiating steps should be performed in response to a downlink failure could be that said defining and initiating steps should be performed if the downlink transmission power used for communicating with the mobile station when the downlink power failure occurred, exceeded a predefined level. A simple way of implementing such a solution (using the "Transmitted Code Power" measurement defined by 3GPP) would be to order radio base stations (Node Bs) to notify a radio network controller when the transmission power used for communication with the mobile station exceeds or falls below defined threshold levels. Hence, the radio network controller could consider whether the downlink transmission power exceeded or was below the defined threshold levels when deciding on how to respond to a downlink radio link. An attempt to prevent a radio link failure could also be made when receiving notification that the downlink transmission power exceeds a defined threshold level by initiating channel down switching to a lower bit rate.

Instead of defining the second set of radio bearers by excluding the user data radio bearer having the highest bit rate in the first set of radio bearers, said user data radio bearer could be replaced in the second set by another radio bearer offering a reduced downlink bit rate, e.g. the packet switched 64 kbps data bearer RB2 in the example scenario of FIG. 3. could be replaced by e.g. a packet switched 16 kbps data bearer.

When applying the invention in UTRAN, typically the UMTS Bearer Service Attribute "Maximum bit rate" could be used for comparing bit rates of different radio bearers.

A Multi-RAB scenario that can be expected to be quite common, is where a speech radio bearer is used in parallel with a radio bearer conveying best effort data (e.g. for sharing still pictures or video clips, transferring a file WWW-surfing etc) using a higher downlink bit rate than the speech radio bearer. Thus, in this type of Multi-RAB scenario, the radio bearer having the highest downlink bit rate is a radio bearer which is less sensitive to delays than other radio bearers in the original (first) set of radio bearers, and consequently, if a downlink radio link failure occurs, this radio bearer will not be included in the second set of radio bearers. Embodiments of the invention could be adapted to specifically address this particular Multi-RAB scenario of speech in combination with a higher bit rate best effort data radio bearer.

Even though the invention in its first exemplary embodiment has been applied to a UMTS radio access network, the invention may of course be applied in other radio access networks where several radio bearers (or services) are used in parallel for communicating user data over a radio interface between the radio access network and a mobile station/terminal and where a downlink radio link failure would affect two or more of said radio bearers.

The invention claimed is:

1. A method in a radio access network for reestablishing wireless communication with a mobile station:
   detecting a downlink radio link failure affecting a first set of radio bearers including at least two radio bearers assigned for communicating user data between the radio access network and the mobile station;
   defining a second set of radio bearers for communicating user data in response to said detecting; and,
   initiating reestablishment of communication with the mobile station using the second set of radio bearers;
   wherein said second set of radio bearers is defined to include only radio bearers having a downlink bit rate which is less than the highest downlink bit rate of any radio bearer in the first set of radio bearers.

2. A method according to claim 1, wherein said detecting includes receiving information from the mobile station that the downlink radio link failure has occurred.

3. A method according to claim 1, wherein said at least two radio bearers are multiplexed onto the same at least one physical channel which is monitored for downlink radio link failures.

4. A method according to claim 1, wherein the method further includes a step, after said detecting step, of deciding according to a predetermined rule whether said defining and initiating steps should be performed in response to the detected downlink radio link failure.

5. A method according to claim 4, wherein according to said predetermined rule, said defining and initiating steps are performed if the downlink transmission power used for communication with the mobile station when the downlink radio failure occurred, exceeded a predefined level.

6. A method according to claim 1, wherein the radio bearer in the first set having the highest downlink bit rate is a radio bearer which is less sensitive to delays than other radio bearers in the first set.

7. An apparatus for use in a radio access network, said apparatus comprising:

means for detecting a downlink radio link failure affecting a first set of radio bearers including at least two radio bearers assigned for communicating user data between the radio access network and the mobile station;

means for defining a second set of radio bearers for communicating user data in response to said detecting; and, means for initiating reestablishment of communication with the mobile station using the second set of radio bearers;

wherein said means for defining are adapted to include in the second set of radio bearers only radio bearers having a downlink bit rate which is less than the highest downlink bit rate of any radio bearer in the first set of radio bearers.

8. An apparatus according to claim 7, wherein said detecting includes receiving information from the mobile station that the downlink radio link failure has occurred.

9. An apparatus according to claim 7, wherein said at least two radio bearers are multiplexed onto the same at least one physical channel which is monitored for downlink radio link failures.

10. An apparatus according to claim 7, wherein the apparatus further includes deciding means for deciding, according to a predetermined rule, whether said defining and initiating means should be activated in response to the detected downlink radio link failure.

11. An apparatus according to claim 10, wherein according to said predetermined rule, said defining and initiating means are activated if the downlink transmission power used for communication with the mobile station when the downlink radio failure occurred, exceeded a predefined level.

12. An apparatus according to claim 7, wherein the radio bearer in the first set having the highest downlink bit rate is a radio bearer which is less sensitive to delays than other radio bearers in the first set.

13. An apparatus according to claim 7, wherein the apparatus is a radio network controller.

14. A radio access network including an apparatus according to claim 7.

* * * * *

UNITED STATES PATENT AND TRADEMARK OFFICE
CERTIFICATE OF CORRECTION

PATENT NO. : 7,756,532 B2
APPLICATION NO. : 11/568667
DATED : July 13, 2010
INVENTOR(S) : Wallentin et al.

It is certified that error appears in the above-identified patent and that said Letters Patent is hereby corrected as shown below:

Title Page, Item (76), under "Inventors", in Column 1, Line 1, delete "Hjalmsatersgatan 2B, Linkoping" and insert -- Hjälmsätersgatan 2B, Linköping --, therefor.

Title Page, Item (76), under "Inventors", in Column 1, Line 4, delete "Linkoping" and insert -- Linköping --, therefor.

Title Page, Item (73) Assignee, Insert -- (73) Assignee: Telefonaktiebolaget LM Ericsson (Publ), Stockholm, SE --.

In Column 2, Line 33, delete "FIG. 1" and insert -- FIG. 1. --, therefor.

In Column 2, Line 61, delete "the the" and insert -- the --, therefor.

In Column 3, Line 13, delete "FIG. 1" and insert -- FIG. 1. --, therefor.

In Column 7, Line 14, delete "RN1" and insert -- RAN1 --, therefor.

Signed and Sealed this

Twenty-third Day of November, 2010

David J. Kappos
*Director of the United States Patent and Trademark Office*